United States Patent Office 3,240,764
Patented Mar. 15, 1966

---

3,240,764
POLYTHIOSEMICARBAZIDE CHELATES
Ralph G. Beaman and Tod W. Campbell, Wilmington, Del., assignors to E. I. du Pont de Nemours and Company, Wilmington, Del., a corporation of Delaware
No Drawing. Filed Mar. 13, 1961, Ser. No. 94,966
1 Claim. (Cl. 260—79)

This is a continuation-in-part of application Serial No. 747,592, filed July 10, 1958, now U.S. Patent 3,040,003.

This invention relates to polymeric chelates and, more particularly, to polythiosemicarbazide chelates. It is an object of this invention to provide stable polythiosemicarbazide chelates. Another object of this invention is to provide polymeric chelates in the form of shaped articles. A further object of this invention is to provide a process for preparing polymeric chelates. These and other objects will become apparent from the following detailed description.

In accordance with this invention a polymeric chelate is provided having the repeating structural unit

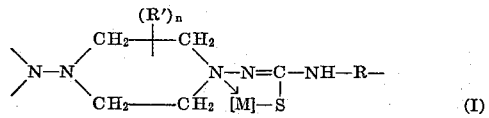
(I)

wherein R is a bivalent organic radical, R' is lower alkyl, $n$ is a cardinal number from 0 to 4, inclusive, and M is a metal ion of a chelate-forming metal having a positive valence.

In general, the polymeric chelates are prepared by polymerizing an N,N'-diaminopiperazine and a difunctional co-reactant capable of forming with the N,N'-diaminopiperazine

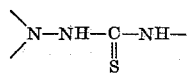

linkages in the polymer chain. The polythiosemicarbazide formed, which has the structure

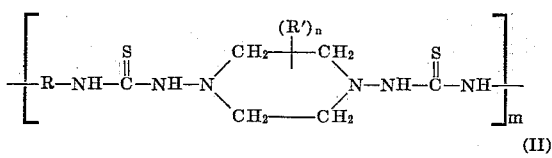
(II)

wherein R is a bivalent organic radical, R' is lower alkyl, $n$ is a cardinal number from 0 to 4, inclusive, and $m$ is an integer greater than 1, is treated with metal ions to provide the structure illustrated in Formula I. The polythiosemicarbazides from which the chelates are formed have inherent viscosities in the range from about 0.1 to 4.0, indicating molecular weights in the range from about 1,000 to one million. Those polymeric structures in the fiber-forming molecular weight range, i.e., 5000 and higher, are preferred.

As illustrated in Formula I, intralinear, five-membered rings are provided by coordination bonding of the metal to a heterocyclic nitrogen atom of the piperazine residue. When chelate-forming metals having a valence of 1 are utilized, a single ring is formed, the positive valence being satisfied by an ionic bond with the sulfur. When the metal has a principal valence of 2, it is chelated in two such rings, giving a preferred linear structure having repeating units as follows:

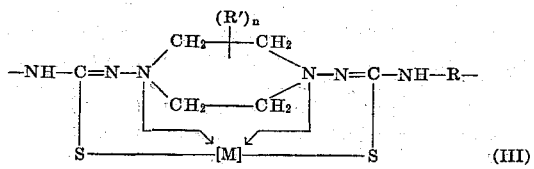
(III)

wherein R, R', M and $n$ are as defined in the foregoing disclosure. If the valence of the metal is 3 or more, three or more such rings will be formed with a heterocyclic nitrogen of an adjacent repeating unit of the same polymer chain or from a different polymer chain giving rise to intermolecular chelation. Both intra- and intermolecular multiple chelation may occur simultaneously with polyvalent metal ions.

Polymerization of the reactants to form the polythiosemicarbazide may be carried out in a solvent medium as described in copending application Serial No. 747,592, now U.S. Patent 3,040,003, and as further described herein. The metal ion, is provided by a suitable ionizable compound, e.g., the chloride, nitrate, carbonate or acetate salt of the chelate-forming metal. The chelate-forming metals form a well-defined class and are identified in the table at page 182 in "Chemistry of the Metal Chelate Compounds" by Martell and Calvin (Prentice-Hall, Inc., New York, 1952). In preparing the chelates, a salt of the metal, e.g., a salt of copper, nickel, lead, iron, aluminum, silver, chromium, niobium, tantalum, tungsten, etc., may be present in the solvent medium, or the polymer may be formed and spun or extruded into a liquid medium containing the metal ions. Alternatively, the polymer may be brought into contact after polymer formation with an aqueous or other solution of the salt.

As used herein, inherent viscosity is calculated as $$\eta_{inh} = \frac{\ln \eta_{rel}}{C}$$

where $\eta_{rel}$ is the flow time for a dilute solution of the polymer in a capillary viscometer divided by the flow time for the pure solvent, both being measured at 30° C., ln is the natural logarithm, and C is equal to 0.5. Initial modulus is determined by measuring the initial slope of the stress-strain curve. Fiber stick temperature is the temperatures at which a sample of the fiber will stick to the smooth surface of a heated brass block when pressed against it.

The following examples, in which parts and percentages are by weight unless otherwise indicated, further illustrate the present invention.

EXAMPLE I

In a 3-necked flask cooled with an ice bath was placed 150 parts of thiophosgene and 1000 parts of ice water. A solution of 87 parts of 4,4'-diaminodiphenylylmethane in 1500 parts of chloroform was added with stirring during a period of about one hour. The mixture was stirred at 0–10° C. for an adidtional two hours, then at room temperature overnight. The chloroform layer was separated and evaporated to dryness under a stream of nitrogen. The solid residue was dissolved in a mixture consisitng of 360 parts of benzene and 622 parts of cyclohexane at the boiling point. The solution was decolorized, filtered, and allowed to crystallize. The fine needle-like precipitate was filtered, washed with cold cyclohexane and recrystallized a second time from benzenecyclohexane as described above. The yield of pure methylene-bis-(4-phenyl-isothiocyanate) was 47 parts with a melting point of 141° to 142° C. which was used to prepare a polythiohydrazide.

In preparing this polymer, 56.4 parts of product prepared as described above were added to a solution of 23.2 parts of N,N'-diaminopiperazine in 660 parts of dimethyl sulfoxide at about 50° C. The mixture rapidly became viscous, and the heating and stirring were discontinued after two hours. The next day the polymer was isolated by precipitation in water and was then chopped up in a Waring Blendor, washed thoroughly in water, and dried. The yield was quantitative, and the product had an inherent viscosity of 1.07 in dimethyl sulfoxide.

0.5 gram of the polymer was dissolved in 5 cc. of dimethyl sulfoxide at room temperature. To the solution was added 0.3 gram of nickel chloride, and the mixture was heated to about 120° C. The initially pale yellowish-green solution turned very dark green and set to a lump of gel.

EXAMPLE II

A solution of 10 grams of the polymer of Example I in 90 ml of dimethyl sulfoxide was extruded through a spinneret into a solution of 180 grams of copper chloride in 2 gallons of dimethyl sulfoxide. Spinning was quite satisfactory, and the bronze-colored filaments were wound up continuously. The filaments were boiled off for one hour in water, and the physical properties were measured. The filaments had a tenacity of 1.1 grams per denier, an elongation of 73%, and an initial modulus of 31. The filaments contained 6.1% by weight of chelated copper.

The spinning bath was then altered by the addition of 150 ml. of triethylamine. Spinning was still continuous, and the filaments were jet black. Although the filaments were weaker than those obtained when the dimethyl sulfoxide bath was used, they could be wound up continuously. The percent copper was found to be 13.0%

The copper-containing chelate filaments were found to have fiber stick temperatures in the range of 250° to 260 C. Wet-spun fibers of the polythiosemicarbazide had an appreciably lower fiber stick temperature of about 205° C.

EXAMPLE III

Two grams of the polymer of Example I were dissolved in 16.5 parts of dimethyl sulfoxide, and 1.6 grams of lead nitrate was added. A film was cast and dried at 100° C. The infrared spectrum of the as-cast film showed very strong evidence for the presence of nitrate ions. A sample of this film was boiled with dilute piperidine, and the infrared spectrum of the extracted material was measured. All evidence of the nitrate group had disappeared. The sample of film before extraction contained 18.0% by weight of lead, and after extraction 17.0% lead.

EXAMPLE IV

A mixture of 0.58 gram of N,N'-diaminopiperazine, 1.42 grams of methylene-bis-(4-phenylene isothiocyanate), 1.65 grams of lead nitrate, and 8.0 ml. of dimethyl sulfoxide was stirred and warmed on a hot plate. The mixture, a straw-colored solution, became quite viscous and was cast to a clear, tough film into water. Filaments were also wet-spun by extrusion into water. The film and filaments contained over 5% by weight of chelated lead.

EXAMPLE V

Solutions of the polymer of Example I in dimethyl sulfoxide were mixed with dimethylformamide solutions of various ions, then precipitated with vigorous stirring under basic and neutral conditions. In preparing the ion solutions, 0.3–0.5 gram of the metal salt was dissolved in 100 ml. of dimethylformamide and a 5-ml. aliquot of a polymer solution, containing 7.96 grams of a polymer in 115 ml. of dimethyl sulfoxide was added. In part of the experiments, 10 ml. of triethylamine ($Et_3N$) was added with vigorous stirring. The precipitated polymer was filtered, washed, and dried. In the other experiments, sufficient water to precipitate the polymer was substituted for triethylamine. All samples were vacuum dried and analyzed. The chelates obtained were characterized by (1) analysis for metal, and (2) shift in the infrared band at $7.6\mu$ characteristic of the chelate ring. The results are recorded in the following table:

*Table*

| Metal Compound | Color of Chelate | Percent Metal | Percent Calculated | IR (Shift in 7.6 Region) |
| --- | --- | --- | --- | --- |
| $NiCl_2+Et_3N$ | Brown-Black | 13.1 | 12.9 | Strong. |
| $CoCl_2+Et_3N$ | ____do____ | 7.0 | 12.9 | Do. |
| $CuCl_2+Et_3N$ | Black | 13.0 | 13.7 | Do. |
| $Hg(OAc)_2+Et_3N$ | Straw | 35.8 | 33.0 | Medium. |
| $CuCl_2+H_2O$ | Purplish Grey | 9.7 | 13.7 | Do. |
| $AgNO_3+H_2O$ | Straw | 33.0 | 35.0 | Strong. |
| $Hg(OAc)_2+H_2O$ | Grey | 38.0 | 33.0 | Medium. |
| $FeCl_3+Et_3N$ | Burnt Sienna | 15.6 | 12.3 | |

EXAMPLE VI

Forty (40) parts of methylene-bis-(4-phenyl isothiocyanate) were combined with 20.4 parts of 2,5-dimethyl-N,N'-diaminopiperazine in 500 parts of dimethyl sulfoxide. The mixture was stirred for three hours. It was then diluted with dimethylformamide, precipitated into water, and the polymeric product filtered therefrom and dried. A yield of 62 grams of polymer, having a melt temperature of 270° C. and an inherent viscosity of 0.84, was obtained. Polymeric chelates could be prepared using the polymer as described in Example V.

In carrying out the present invention, a great number of compounds, in addition to those illustrated in the examples, may be utilized in preparing the polythiosemicarbazide chelates. Any of the known alkyl-substituted N,N'-diaminopiperazines in which the alkyl groups contain from one to four carbon atoms may be utilized, e.g., N,N' - diaminopiperazine, N,N' - diamino-2,6-dimethylpiperazine, N,N'-diamino-2,5-dimethylpiperazine, N,N'-diamino - 2,5 - diethylpiperazine, N,N'-diamino-2-methylpiperazine, etc. The N,N'-diaminopiperazines may be prepared by (1) nitrosation of a piperazine, (2) zinc-acetic acid reduction of the dinitrosopiperazine, (3) isolation of the bis-hydrazine by precipitation in the form of its dihydrochloride, and (4) regeneration of the free base by treatment of the salt with alcoholic potassium hydroxide.

In addition to the diisothiocyanates disclosed, other useful diisothiocyanates include 4-methyl-m-phenylene diisothiocyanate, m-phenylene diisothiocyanate, 4,4'-bisphenylene diisothiocyanate, methylene-bis - (4 - phenylisothiocyanate), 4-chloro-1,3-phenylene diisothiocyanate, 1,5-naphthylene diisothiocyanate, 1,4-tetramethylene diisothiocyanate, 1,6-hexamethylene diisothiocyanate, 1,10-decamethylene diisothiocyanate, 1,4-cyclohexylene diisothiocyanate, 4,4' - methylene - bis - (cyclohexylisothiocyanate), and 1,5-tetrahydronaphthalene diisothiocyanate. Arylene diisothiocyanates, i.e., those in which each of the isothiocyanate groups is attached directly to an aromatic ring are preferred. The diisothiocyanates may contain other substituents such as methoxy groups and bromo groups.

Alternative coreactants which provide the thiosemicarbazide linkages when reacted with an N,N′-diaminopiperazine include bis-thiocarbamyl halides equivalent to the reactants indicated above. While the terminal groups of the coreactants must, of course, be capable of reacting with the active hydrogen of the N,N′-diaminopiperazine to provide the thiosemicarbazide linkages, the coreactants should be otherwise free of substituents capable of reacting with the active hydrogen.

As illustrated in the examples, moderate temperatures may be used in preparing the products of this invention. Generally, the polythiosemicarbazides can be prepared at temperatures at or near room temperature. However, in obtaining the polymeric chelates, it may sometimes be necessary to apply additional heat, e.g., in the range from 50° C. to 150° C. or higher. The selectivity for various metal ions may also be affected by the pH of the polymer solution. By adding a base or acid to adjust the pH, optiumum results can be obtained utilizing a wide variety of ionizable metal compounds. Normally, a base, e.g., an amine such as triethylamine or piperidine, is employed to keep the pH above 3, and a pH value of 7 or greater is most effective and, therefore, preferred.

As indicated previously, polymerization of the reactants is preferably carried out in a solvent medium. Preferably the same solvent as used in the polymerization is utilized to dissolve the ionizable metal compound. While the polythiosemicarbazides are not all soluble in the same solvents, solutions may be prepared in one or more of such solvents as dimethyl sulfoxide, N,N-dimethylformamide, N,N-dimethylacetamide, tetrahydrofuran, tetramethylurea, Cellosolve, and mixtures of N,N-dimethylformamide and tetrachloroethylene.

As indicated in the examples, certain of the polymeric chelates of the present invention may be obtained as fibers of textile denier. The fibers so prepared may be used in a variety of applications, e.g., as protective clothing for use in exposure to heat or electromagnetic or particle radiation, as special filters, as reservoirs of metallic ions, etc. The fibers may be employed as absorbent surfaces or as semi-permeable membranes. The chelate-forming polymers in their insoluble form may be used directly for the extraction and separation of metal ions from one another where they occur in solution. Also, the polymers may be used to form chelates in the removal of contaminant metal ions, e.g., in preparation of high-purity water.

As many widely different embodiments of this invention may be made without departing from the spirit and scope thereof, it is to be understood that this invention is not to be limited to the specific embodiments thereof except as defined in the appended claim.

We claim:

As a new composition of matter, a polymeric chelate having a molecular weight within the range of 1,000 to 1,000,000 and consisting of repeating structural units having the formula

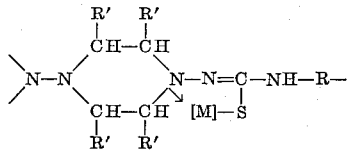

where R is a bivalent hydrocarbon radical and R′ is selected from the group consisting of hydrogen, methyl and ethyl with the proviso that at least two of the R′ substituents are hydrogen, and M is a metal ion of a chelate-forming metal selected from the group consisting of nickel, cobalt, copper, mercury, silver, iron and lead.

References Cited by the Examiner

UNITED STATES PATENTS 3,040,003  6/1962  Beaman _____ 260—77.5

OTHER REFERENCES

Schraufstatter: Chemical Abstracts, vol. 44, 8999i, 1950.

Podchainova: Chemical Abstracts, vol. 52, 1958, Reaction of Copper Ion With Thiosemicarbazide, page 19697.

Reid: Organic Chemistry of Bivalent Sulfur, vol. VC, 1963, Chemical Publishing Co. Inc., New York, N.Y., pages 202–204.

LEON J. BERCOVITZ, *Primary Examiner.*

HAROLD BURSTEIN, *Examiner.*